US012683462B2

(12) United States Patent
Wu

(10) Patent No.: US 12,683,462 B2
(45) Date of Patent: Jul. 14, 2026

(54) POWER GENERATING WHEEL RIM DEVICE

(71) Applicant: COPLUS INC., Tainan City (TW)

(72) Inventor: Po-Hua Wu, Tainan City (TW)

(73) Assignee: COPLUS INC., Tainan City (TW)

( * ) Notice: Subject to any disclaimer, the term of this patent is extended or adjusted under 35 U.S.C. 154(b) by 271 days.

(21) Appl. No.: 18/666,129

(22) Filed: May 16, 2024

(65) Prior Publication Data

US 2025/0233482 A1 Jul. 17, 2025

(30) Foreign Application Priority Data

Jan. 15, 2024 (TW) ................................. 113101557

(51) Int. Cl.
*H02K 7/18* (2006.01)
(52) U.S. Cl.
CPC .................................. *H02K 7/1846* (2013.01)
(58) Field of Classification Search
CPC ........... B62J 6/12; B60K 7/0007; H02K 9/06; H02K 7/1846; H02K 11/33; G01S 19/13; B60C 23/041; B60C 23/0418; B60C 23/0447; B60C 23/20; B60C 23/0406; G06F 7/00; G06K 19/0723
See application file for complete search history.

(56) References Cited

U.S. PATENT DOCUMENTS 11,325,416 B2 * 5/2022 Van Houten .............. B60B 5/02
11,607,905 B2 * 3/2023 Christensen .............. B60B 7/01
2015/0298537 A1 * 10/2015 Duhamel ................. H02K 9/16
301/6.5

* cited by examiner

*Primary Examiner* — Leda T Pham
(74) *Attorney, Agent, or Firm* — Burris Law, PLLC

(57) ABSTRACT

A power generating wheel rim device includes a wheel rim body, a power generating mechanism, a cover mechanism, and a circuit mechanism. The wheel rim body includes a central plate and a central slot recessed into the central plate. The power generating mechanism is embedded in the central slot and is operable to be driven by the wheel rim body to rotate and to generate electricity. The cover mechanism covers the power generating mechanism, is mounted to the central plate of the wheel rim body, and includes an air permeable passage structure that is annular and disposed along a periphery of the cover mechanism and that is in spatial communication with an external environment and the central slot. The circuit mechanism is mounted in the cover mechanism and is electrically connected to the power generating mechanism for converting alternating current of the electricity generated into direct current.

10 Claims, 10 Drawing Sheets

POWER GENERATING WHEEL RIM DEVICE

CROSS-REFERENCE TO RELATED APPLICATION

This application claims priority to Taiwanese Invention Patent Application No. 113101557, filed on Jan. 15, 2024, the entire disclosure of which is incorporated by reference herein.

FIELD

The disclosure relates to a wheel rim, and more particularly to a power generating wheel rim device.

BACKGROUND

Energy conservation and carbon reduction is a policy that many countries around the world are actively promoting. Apart from energy conservation and utilizing natural energy sources to generate electricity for reducing carbon emissions, the policy also focuses on converting kinetic energy of a moving object into electrical energy for reuse. For example, when a vehicle moves, the kinetic energy of a wheel is converted into electrical energy for reuse.

Currently, a generator capable of converting rotational kinetic energy into electrical energy may be disposed on the wheel, but design of the generator does not take into consideration of dissipating the heat generated during conversion of the rotational kinetic energy, so the center of a wheel rim may face the risk of overheating.

SUMMARY

Therefore, an object of the disclosure is to provide a power generating wheel rim device that can alleviate at least one of the drawbacks of the prior art.

According to the disclosure, the power generating wheel rim device includes a wheel rim body, a power generating mechanism, a cover mechanism, and a circuit mechanism.

The wheel rim body includes a central plate and a central slot that is recessed into the central plate.

The power generating mechanism is embedded in the central slot and is operable to be driven by the wheel rim body to rotate and to generate electricity.

The cover mechanism covers the power generating mechanism, is mounted to the central plate of the wheel rim body, and includes an air permeable passage structure that is annular and disposed along a periphery of the cover mechanism and that is in spatial communication with an external environment and the central slot.

The circuit mechanism is mounted in the cover mechanism and is electrically connected to the power generating mechanism for converting alternating current of the electricity generated by the power generating mechanism into direct current.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
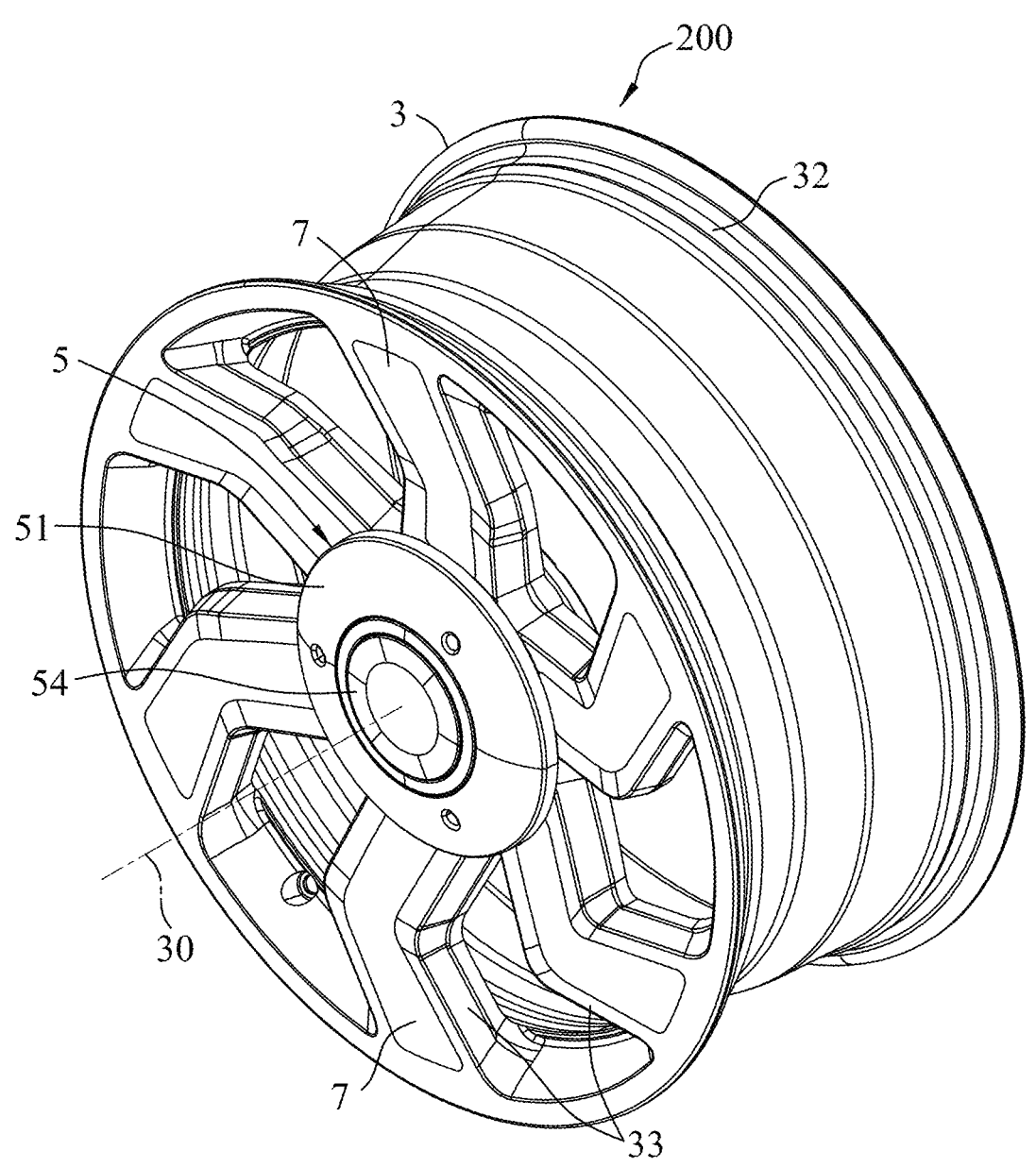
FIG. 1 is a perspective view illustrating a first embodiment of a power generating wheel rim device.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
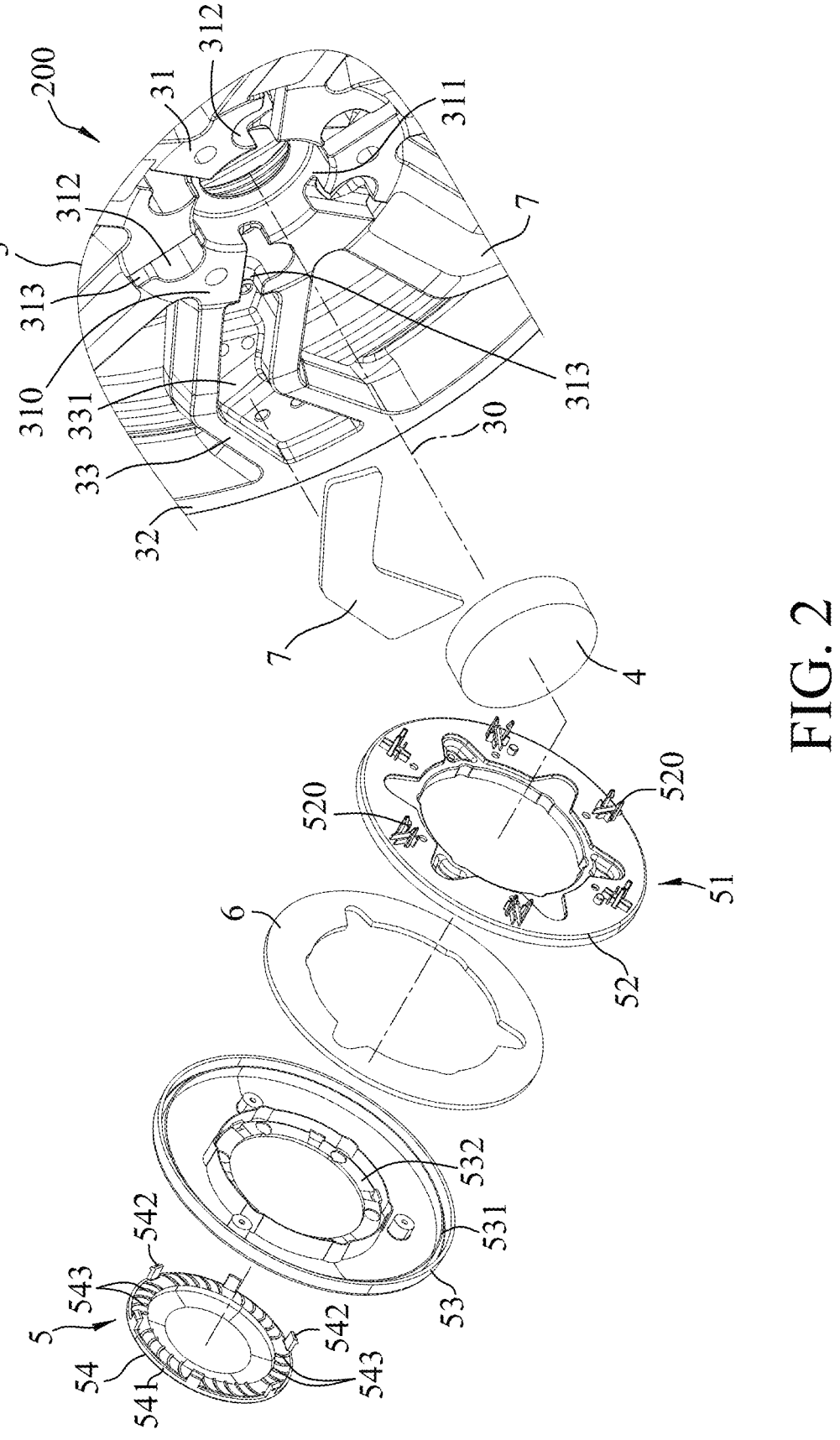
FIG. 2 is a fragmentary exploded perspective view of the first embodiment.

Referring to FIGS. 1 and 2, a first embodiment of a power generating wheel rim device 200 according to the present disclosure is adapted to be assembled with a tire for forming a car wheel and to be mounted on an axle (not shown) of a vehicle. The power generating wheel rim device 200 includes a wheel rim body 3 mounted fixedly to the axle, a power generating mechanism 4 coaxially mounted to the wheel rim body 3, a cover mechanism 5 mounted to the wheel rim body 3 and covering the power generating mechanism 4, a circuit mechanism 6 mounted in the cover mechanism 5 and electrically connected to the power generating mechanism 4, and a plurality of decorative plates 7 disposed on the wheel rim body 3.

The wheel rim body 3 includes an inner frame 31 defining a central plate 310 and a central slot 311, an outer frame portion 32 coaxially surrounding and spaced apart radially from a periphery of the inner frame 31, and a plurality of spoke portions 33 spaced apart angularly about an axis 30, arranged along the periphery of the inner frame 31, and interconnecting the periphery of the inner frame 31 and a periphery of the outer frame portion 32 that face each other.

The inner frame 31 includes the central plate 310 facing outwardly, the central slot 311 disposed around the axis 30 and recessed into the central plate 310, a plurality of fastening holes 312 recessed into the central plate 310 and spaced apart angularly about the axis 30 and along an outer periphery of the central slot 311, and a plurality of communication channels 313 recessed into the central plate 310 and extending radially from the central slot 311 to the spoke portions 33, respectively. Each of the fastening holes 312 is configured for extension of a bolt (not shown) therethrough to be fastened to the axle. The communication channels 313 extend respectively through the fastening holes 312.

An outer side surface of each of the spoke portions 33 is recessed with an accommodating groove 331 that is in spatial communication with a corresponding one of the communication channels 313. Each of the accommodating grooves 331 is used for accommodating an electronic component (not shown), such as a light-emitting diode (LED) light, or for accommodating an energy storage device (not shown). The decorative plates 7 are respectively mounted to the spoke portions 33, and respectively cover the accommodating grooves 331.

Since there are numerous types of the spoke portions 33 of the wheel rim body 3, the illustrated design in this disclosure is merely an example, and the actual design of the spoke portions 33 is not limited thereto.

Figure 3:
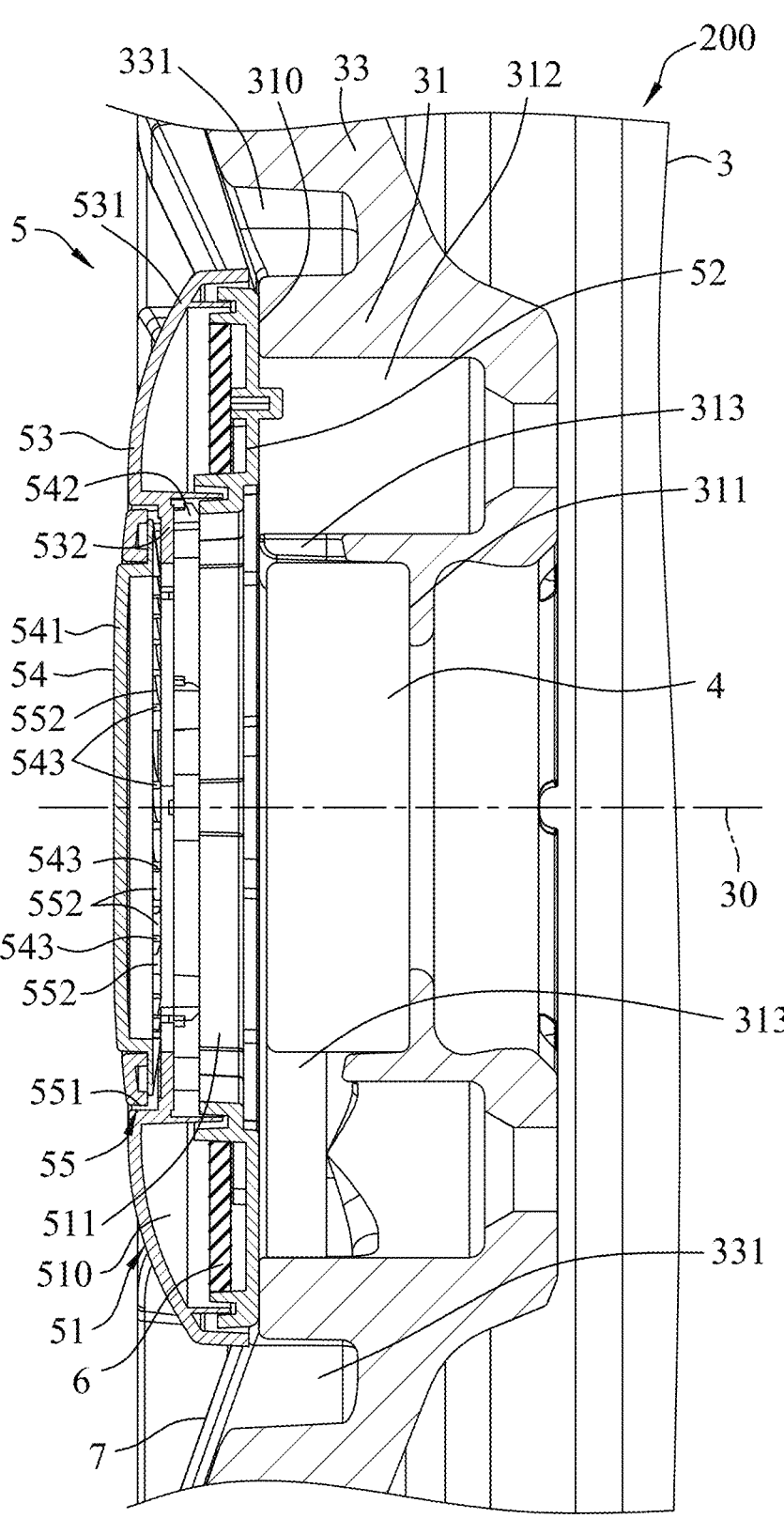
FIG. 3 is a fragmentary side sectional view of the first embodiment.
Figure 4:
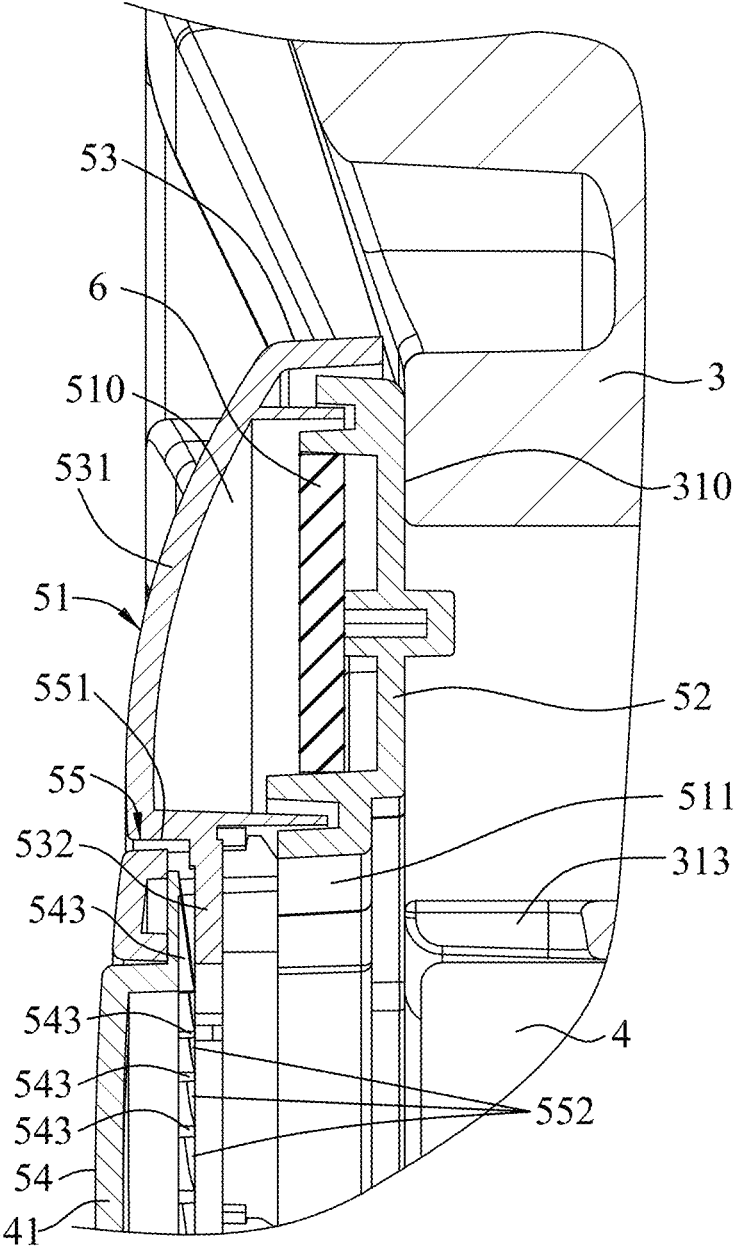
FIG. 4 is an enlarged fragmentary sectional view of FIG. 3.

Referring to FIGS. 2, 3, and 4, the power generating mechanism 4 is embedded fixedly in the central slot 311, and is operable to be driven by the wheel rim body 3 to rotate and to generate electricity. Since the power generating mechanism 4 is not a focus of this disclosure, a detailed description thereof is omitted.

The cover mechanism 5 includes a ring seat unit 51 coaxially and fixedly mounted to the central plate 310 of the wheel rim body 3 along the axis 30, and a decorative cover 54 coaxially and fixedly mounted to an inner periphery of the ring seat unit 51. The ring seat unit 51 defines an annular mounting space 510 therein, and surrounds and defines an inner surrounded space 511 that is at the inner periphery thereof and that is in spatial communication with the central slot 311. The decorative cover 54 is disposed in and covers the inner surrounded space 511. The cover mechanism 5 also includes an air permeable passage structure 55 that is formed between the ring seat unit 51 and the decorative cover 54, that is disposed along a periphery of the decorative cover 54, and that is in spatial communication with an external environment, the inner surrounded space 511, and the central slot 311.

The ring seat unit 51 includes an inner ring seat 52 coaxially fixed onto the central plate 310 of the wheel rim body 3, and an outer ring seat 53 coaxially fixed onto the inner ring seat 52. The outer ring seat 53 includes an outer ring body 531 disposed on the inner ring seat 52 and cooperating with the inner ring seat 52 to define the mounting space 510 and the inner surrounded space 511, and an annular mounting wall portion 532 extending radially from an inner periphery of the outer ring body 531 and into the inner surrounded space 511. In this embodiment, the inner ring seat 52 is fastened onto the wheel rim body 3 through a plurality of engaging portions 520 that are spaced apart angularly about the axis 30. In practice, the manner in which the inner ring seat 52 is fixed onto the wheel rim body 3 is not limited to what is disclosed herein, and may be fixed using bolts.

Figure 5:
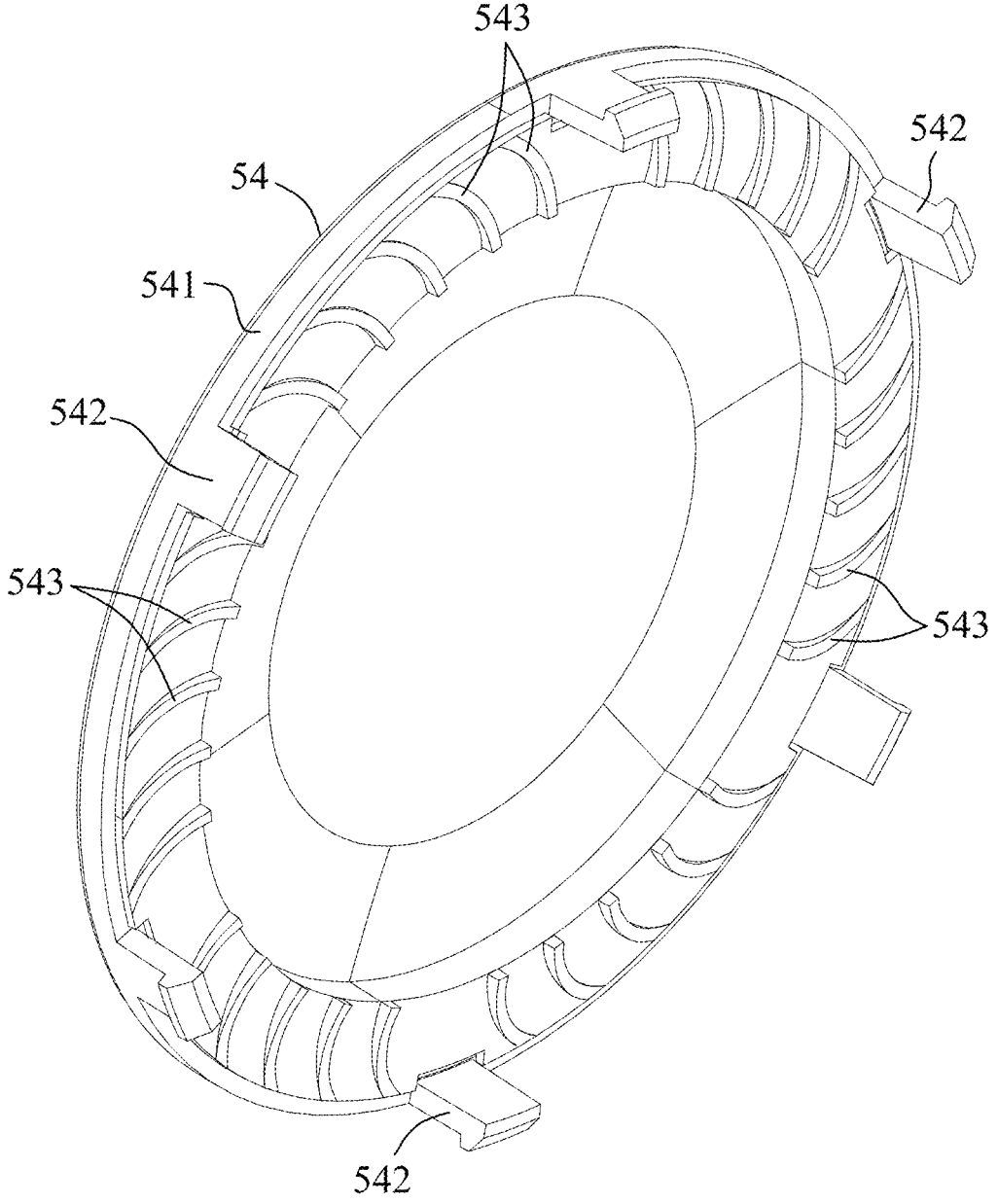
FIG. 5 is a perspective view illustrating a decorative cover of the first embodiment.

Referring to FIGS. 3, 4, and 5, the decorative cover 54 includes a plate body 541 radially spaced apart from the outer ring body 531 and mounted fixedly in the inner surrounded space 511 (i.e., coaxially mounted on the ring seat unit 51 along the axis 30 and covering the inner surrounded space 511), and a plurality of fins 543 spaced apart angularly about the axis 30 and extending from the plate body 541 toward the annular mounting wall portion 532 of the outer ring seat 53 of the ring seat unit 51 along the axis 30. A length of each of the fins 543 protruding toward the annular mounting wall portion 532 gradually increases in a direction from an outer periphery of the plate body 541 to an inner periphery thereof. A portion of each of the fins 543 that is largest in length abuts against the annular mounting wall portion 532.

In this embodiment, the plate body 541 includes a plurality of engaging portions 542 spaced apart angularly from each other about the axis 30, and is fixed onto the outer ring seat 53 by the engaging portions 542 through engaging the annular mounting wall portion 532 along the axis 30. However, in practice, the plate body 541 may be fixed onto the outer ring seat 53 in many ways, and may be fixed using bolts.

Figure 6:
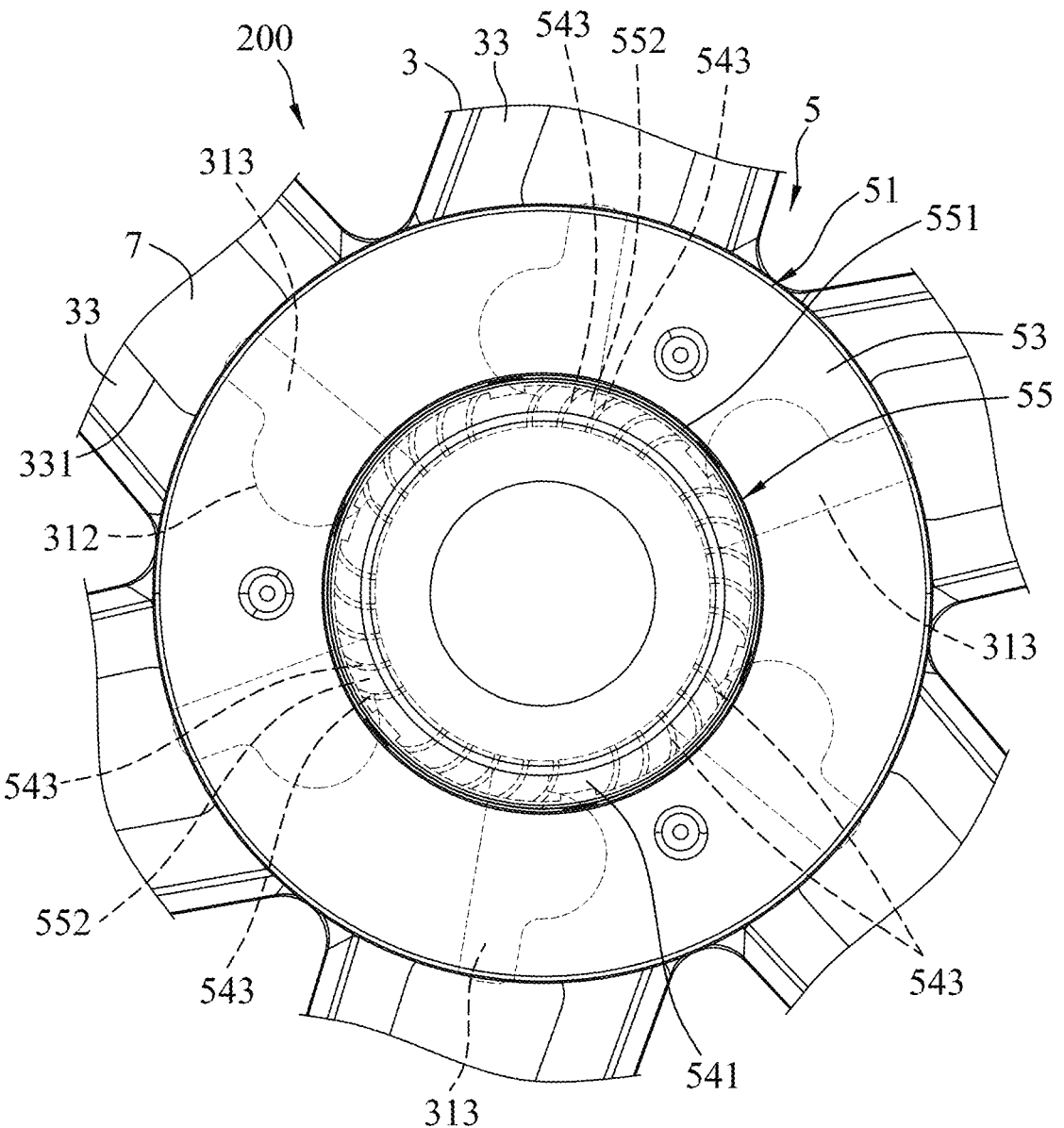
FIG. 6 is a fragmentary front view of the first embodiment, illustrating an air permeable passage structure.

Referring to FIGS. 4, 5, and 6, the air permeable passage structure 55 includes an outer annular passage 551 extending along the periphery of the decorative cover 54, formed between the outer periphery of the plate body 541 of the decorative cover 54 and the outer ring body 531 of the outer ring seat 53 of the ring seat unit 51, and being in spatial communication with the external environment, and a plurality of air permeable grooves 552 formed respectively between adjacent ones of the fins 543 and being in spatial communication with the outer annular passage 551 and the inner surrounded space 511. The air permeable grooves 552 are distributed and spaced apart angularly from each other about the axis 30. The air permeable grooves 552 are in spatial communication with the central slot 311 via the inner surrounded space 511.

The circuit mechanism 6 is mounted in the mounting space 510, and may be used to convert alternating current of the electricity generated by the power generating mechanism 4 into direct current. In practice, the circuit mechanism 6 may be electrically connected to the electronic components installed in the accommodating grooves 331 for directly supplying power to drive the electronic components, for example but not limited to, a tire pressure detector or a light-emitting component. In practice, the circuit mechanism 6 may be electrically connected to the energy storage devices in the accommodating grooves 331, so that the circuit mechanism 6 may store the electricity generated by the power generating mechanism 4 in the energy storage device.

Referring to FIGS. 2, 3, and 6, when the power generating wheel rim device 200 of this disclosure is used in the car wheel and is mounted on the vehicle, during rotation as the vehicle moves, the wheel rim body 3 drives the power generating mechanism 4 to rotate synchronously so that the power generating mechanism 4 rotates to generate electricity. At the same time, since the air permeable passage structure 55 communicates with the external environment and the inner surrounded space 511, external air may be introduced into the inner surrounded space 511 through the air permeable passage structure 55, thereby dissipating heat generated by the power generating mechanism 4 in the inner surrounded space 511. In addition, some air flows entering the central slot 311 and the inner surrounded space 511 are also dispersed into the accommodating grooves 331 of the spoke portions 33 through the communication channels 313, which may similarly dissipate heat.

In the present embodiment, the fins 543 are designed to curvedly extend from the outer periphery of the plate body 541 toward the inner periphery of the plate body 541. In practice, the fins 543 may also be designed to be radially straight.

Figure 7:
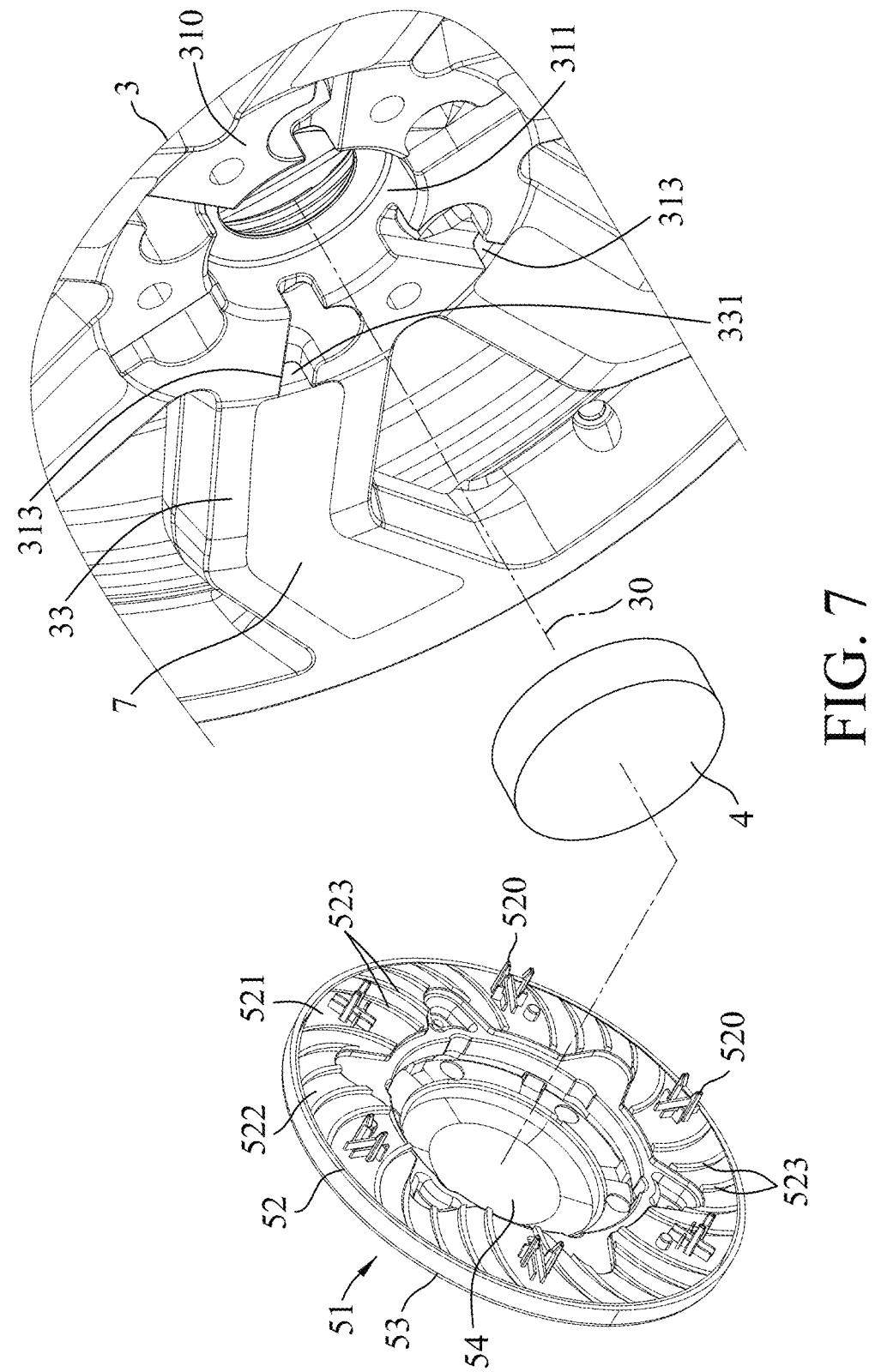
FIG. 7 is a fragmentary exploded perspective view illustrating a second embodiment of the power generating wheel rim device.
Figure 8:
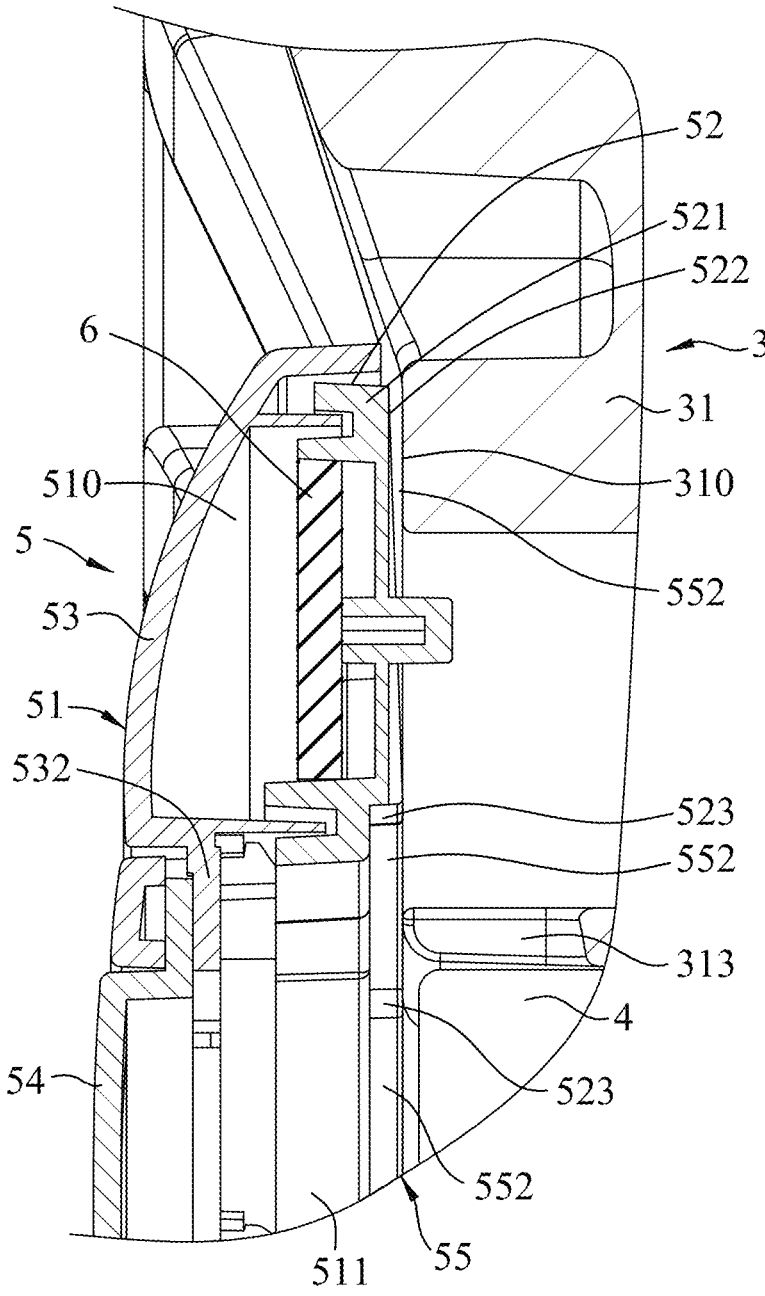
FIG. 8 is a fragmentary side sectional view of the second embodiment.

Referring to FIGS. 7 and 8, the difference between a second embodiment of the disclosure differs from the first embodiment resides in the structural design of the cover mechanism 5. For the convenience of description, only the differences will be described.

In the second embodiment, the cover mechanism 5 includes the ring seat unit 51, the decorative cover 54, and the air permeable passage structure 55.

The ring seat unit 51 includes the inner ring seat 52 fixed onto the central plate 310, and the outer ring seat 53 fixed onto the inner ring seat 52. The decorative cover 54 is not provided with the fins 543, and abuts fixedly against the annular mounting wall portion 532 of the outer ring seat 53 to cover the inner surrounded space 511.

The inner ring seat 52 includes an inner ring body 521 mounted to the inner frame 31 and having an inner ring surface 522 that faces the central plate 310, and a plurality of fin portions 523 extending from the inner ring surface 522 toward the central plate 310 and spaced apart angularly about the axis 30. Each of the fin portions 523 abuts against the central plate 310, and extends from an outer periphery of the inner ring body 521 to an inner periphery of the inner ring body 521. The inner ring body 521 cooperates with the outer ring seat 53 to define the mounting space 510 and the inner surrounded space 511.

The air permeable passage structure 55 includes the plurality of air permeable grooves 552 that are respectively located between adjacent ones of the fin portions 523 and that are in spatial communication with the external environment and the inner surrounded space 511. The air permeable grooves 552 are in spatial communication with the central slot 311 through the inner surrounded space 511, and some of the air permeable grooves 552 are in spatial communication with the communication channels 313.

During the rotation of the power generating wheel rim device 200 of the present disclosure in generating electricity, by virtue of the structural design of the air permeable grooves 552 of the air permeable passage structure 55, the heat generated by the power generating mechanism 4 may be dissipated, and by virtue of the spatial communication between the air permeable grooves 552 and the communication channels 313, the heat may also be dissipated.

Figure 9:
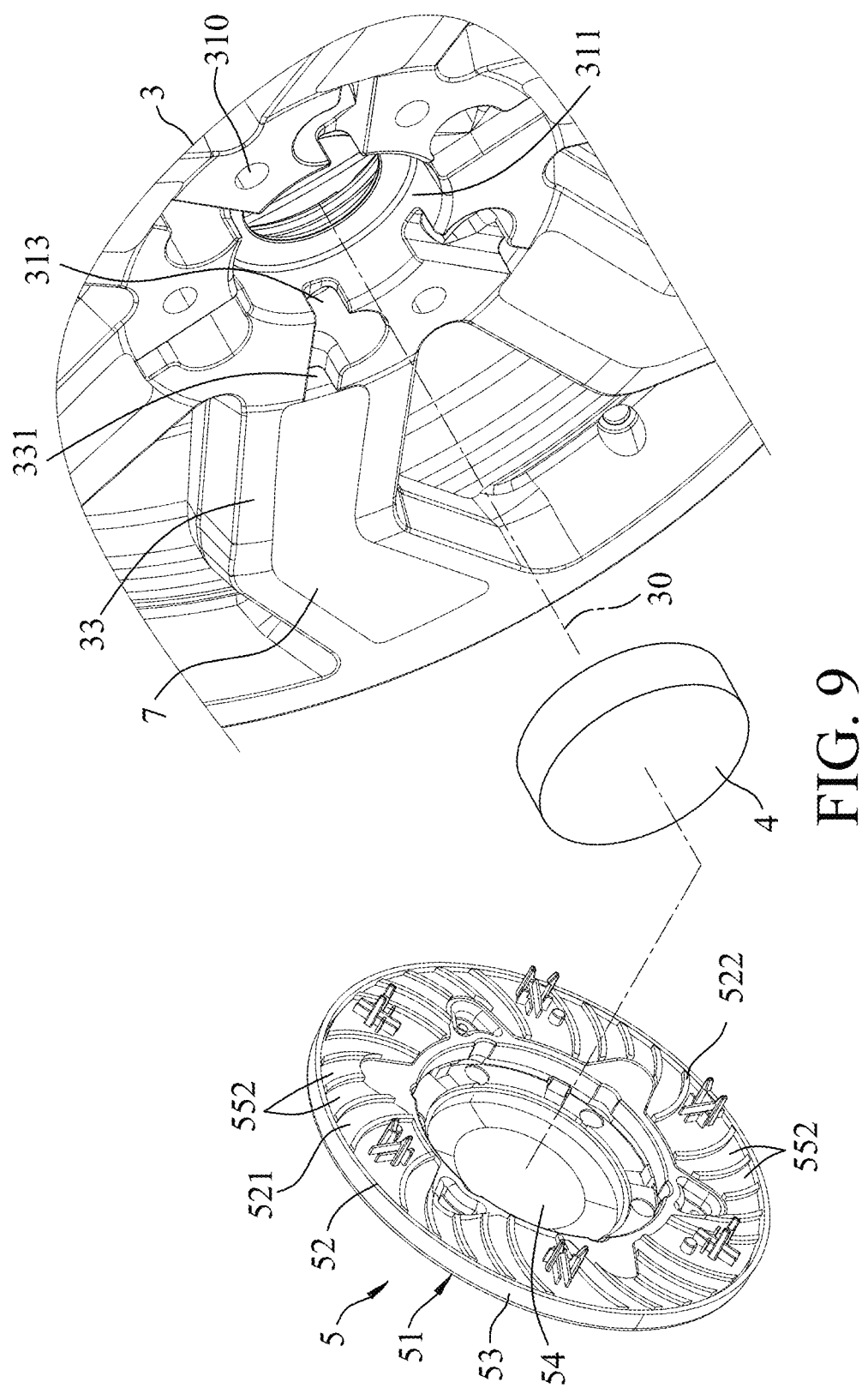
FIG. 9 is a fragmentary exploded perspective view illustrating a third embodiment of the power generating wheel rim device.
Figure 10:
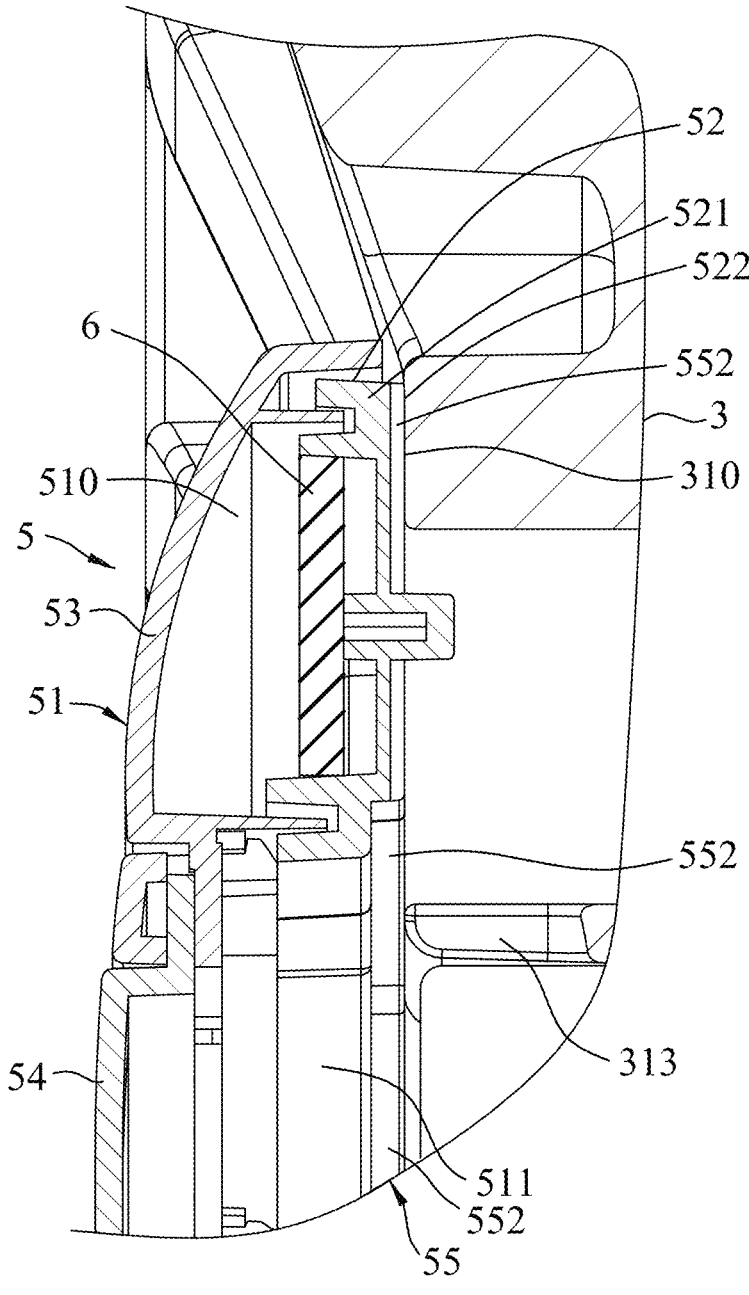
FIG. 10 is a fragmentary side sectional view of the third embodiment.

Referring to FIGS. 9 and 10, the difference between a third embodiment and the second embodiment resides in the structural design of the inner ring seat 52 and the air permeable passage structure 55.

In the third embodiment, the inner ring seat 52 is not provided with the fin portions 523, and the inner ring surface 522 of the inner ring body 521 abuts against the central plate 310.

The air permeable passage structure 55 includes the plurality of air permeable grooves 552 spaced apart angularly about the axis 30 and recessed into the inner ring surface 522 of the inner ring body 521. Each of the air permeable grooves 552 extends from the outer periphery of the inner ring body 521 to the inner periphery thereof, and is in spatial communication with the external environment and the inner surrounded space 511. Some of the air permeable grooves 552 are in spatial communication with the communication channels 313.

By virtue of the structural design of the air permeable grooves 552 of the air permeable passage structure 55, the heat generated by the power generating mechanism 4 during operation may be dissipated.

It should be noted that in the abovementioned embodiments, it is not necessary for the wheel rim body 3 to include the communication channels 313 and the accommodating grooves 331. When the accommodating grooves 331 are not present, the decorative plates 7 are also omitted.

In summary, by virtue of the structural design of the air permeable passage structure 55 of the cover mechanism 5 mounted to the wheel rim body 3, the heat generated by the power generating mechanism 4 may be effectively dissipated during generation of electricity by the power generating mechanism 4 which is driven by the wheel rim body 3 to rotate, thereby preventing overheating of the power generating mechanism 4. Therefore, the power generating wheel rim device 200 of this disclosure is innovative and convenient, and the object of this disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A power generating wheel rim device, comprising:
 a wheel rim body including a central plate and a central slot that is recessed into said central plate;
 a power generating mechanism embedded in said central slot and operable to be driven by said wheel rim body to rotate and to generate electricity;
 a cover mechanism covering said power generating mechanism, mounted to said central plate of said wheel rim body, and including an air permeable passage structure that is annular and disposed along a periphery of said cover mechanism and that is in spatial communication with an external environment and said central slot; and
 a circuit mechanism mounted in said cover mechanism and electrically connected to said power generating mechanism for converting alternating current of the electricity generated by said power generating mechanism into direct current.

2. The power generating wheel rim device as claimed in claim 1, wherein said cover mechanism includes a ring seat unit coaxially and fixedly mounted to said central plate along an axis, and a decorative cover mounted to said ring seat unit, said ring seat unit surrounding and defining an inner surrounded space that is in spatial communication with said central slot, and defining a mounting space in said ring seat unit for mounting of said circuit mechanism, said decorative cover covering said inner surrounded space, said air permeable passage structure being formed between said decorative cover and said ring seat unit, and disposed along a periphery of said decorative cover to spatially communicate with the external environment and said inner surrounded space.

3. The power generating wheel rim device as claimed in claim 2, wherein said air permeable passage structure includes an outer annular passage extending along said periphery of said decorative cover and being in spatial communication with the external environment, and a plurality of air permeable grooves distributed and spaced apart angularly from each other about said axis and being in spatial communication with said outer annular passage and said inner surrounded space.

4. The power generating wheel rim device as claimed in claim 3, wherein said decorative cover includes a plate body coaxially mounted on said ring seat unit along said axis and covering said inner surrounded space, and a plurality of fins spaced apart angularly about said axis and extending from said plate body toward said ring seat unit along said axis, said outer annular passage being located between an outer periphery of said plate body and said ring seat unit, said air permeable grooves being located between adjacent ones of said fins, respectively.

5. The power generating wheel rim device as claimed in claim 4, wherein said ring seat unit includes an inner ring seat fixed onto said wheel rim body, and an outer ring seat fixed onto said inner ring seat, said outer ring seat including an outer ring body that cooperates with said inner ring seat to define said mounting space and said inner surrounded space, and an annular mounting wall portion that extends from an inner periphery of said outer ring body and into said inner surrounded space, said decorative cover being mounted in said inner surrounded space and abutting against said annular mounting wall portion.

6. The power generating wheel rim device as claimed in claim 5, wherein a length of each of said fins protruding toward said annular mounting wall portion gradually increases in a direction from said outer periphery of said plate body to an inner periphery thereof.

7. The power generating wheel rim device as claimed in claim 1, wherein said cover mechanism includes a ring seat unit coaxially and fixedly mounted to said central plate along an axis, and a decorative cover mounted to said ring seat unit, said ring seat unit defining therein a mounting space for mounting of said circuit mechanism, and surrounding and defining an inner surrounded space that is in spatial communication with said central slot, said air permeable passage structure being disposed along a periphery of said ring seat unit, being in spatial communication with the external environment and said inner surrounded space, said decorative cover covering said inner surrounded space.

8. The power generating wheel rim device as claimed in claim 7, wherein said ring seat unit includes an inner ring seat fixed onto said wheel rim body, and an outer ring seat fixed onto said inner ring seat and cooperating with said inner ring seat to define said mounting space and said inner surrounded space, said inner ring seat having an inner ring surface that faces said central plate of said wheel rim body, said air permeable passage structure including a plurality of air permeable grooves that are recessed into said inner ring surface, that are spaced apart angularly about said axis, and that extend from an outer periphery of said inner ring surface to an inner periphery thereof.

9. The power generating wheel rim device as claimed in claim 7, wherein said ring seat unit includes an inner ring seat fixed onto said wheel rim body, and an outer ring seat fixed onto said inner ring seat, said inner ring seat including an inner ring body that cooperates with said outer ring seat to define said mounting space and said inner surrounded space, and a plurality of fin portions that are disposed around said axis, said inner ring body having an inner ring surface that faces said central plate, said fin portions extending from said inner ring surface toward said central plate, said air permeable passage structure including a plurality of air permeable grooves that are respectively located between adjacent ones of said fin portions and that are in spatial communication with the external environment and said inner surrounded space.

10. The power generating wheel rim device as claimed in claim 1, wherein said wheel rim body includes an inner frame defining said central plate and said central slot, an outer frame portion surrounding and spaced apart from said inner frame, and a plurality of spoke portions arranged along a periphery of said inner frame and interconnecting said periphery of said inner frame and a periphery of said outer frame portion that face each other, said inner frame further including a plurality of communication channels that are recessed into said central plate and that extend radially from said central slot to said spoke portions, respectively, each of said spoke portions being formed with an accommodating groove that is in spatial communication with a corresponding one of said communication channels.

* * * * *